United States Patent
Ohishi et al.

(10) Patent No.: US 7,149,032 B2
(45) Date of Patent: Dec. 12, 2006

(54) ANTI-GLARE FILM

(75) Inventors: Kazuya Ohishi, Shizuoka (JP);
Yoshiaki Matsuura, Shizuoka (JP);
Yasuhiko Motoda, Shizuoka (JP);
Kensaku Higashi, Shizuoka (JP)

(73) Assignee: Tomoegawa Paper Co., Ltd., Tokyo (JP)

( * ) Notice: Subject to any disclaimer, the term of this patent is extended or adjusted under 35 U.S.C. 154(b) by 0 days.

(21) Appl. No.: 11/389,039

(22) Filed: Mar. 27, 2006

(65) Prior Publication Data

US 2006/0221451 A1    Oct. 5, 2006

(30) Foreign Application Priority Data

Mar. 29, 2005  (JP) ............................. 2005-093804
Mar. 31, 2005  (JP) ............................. 2005-101867
Feb. 20, 2006  (JP) ............................. 2006-042128

(51) Int. Cl.
*G02B 1/10* (2006.01)
(52) U.S. Cl. ..................... 359/586; 359/585; 359/589
(58) Field of Classification Search ........ 359/585–586, 359/589, 229, 601
See application file for complete search history.

(56) References Cited

U.S. PATENT DOCUMENTS 6,859,322 B1 *  2/2005  Shoshi et al. ............... 359/582
2002/0060849 A1 *  5/2002  Matsunaga et al. ......... 359/614

FOREIGN PATENT DOCUMENTS

| JP | A 2001-302945 | 10/2001 |
| JP | A 2002-167576 | 6/2002 |
| JP | A 2003-294904 | 10/2003 |

* cited by examiner

*Primary Examiner*—Leonidas Boutsikaris
(74) *Attorney, Agent, or Firm*—Oliff & Berridge, PLC

(57) ABSTRACT

The present invention provides a Fresnel lens sheet capable of successfully avoiding the "collapse", "abrasion" and "moiré" problems. A Fresnel lens sheet constitutes, together with a lenticular lens sheet, a rear projection screen, which is mounted in the frame of a rear projection type display. The Fresnel lens sheet includes, on one surface of its substrate, a Fresnel lens part containing a plurality of lenses concentrically formed on one plane. The apexes of the lenses situated in the area between the center and the outer edge of the Fresnel lens part are flattened to give flat faces, and the widths of the flat faces of the lenses on the outer edge side are made greater than the widths of the flat faces of the lenses on the center side. The widths of the flat faces of the lenses are from 0 to 30 μm.

13 Claims, No Drawings

ANTI-GLARE FILM

FIELD OF THE INVENTION

The present invention relates to an anti-glare film which is formed on the surface of a display such as an LCD, PDP, etc., and in particular, relates to an anti-glare film which can be provided by coating at low cost.

BACKGROUND ART

In recent years, displays such as LCDs, PDPs, etc., have made progress, and products of various sizes which are used for a variety of purposes such as portable telephones, large screen TVs, etc., have been produced and sold. In general, a layer having an anti-reflection function is provided on the surface of these displays in order to further improve visibility. The anti-reflection technology includes an anti-glare film to prevent ambient light from being reflected and an anti-reflection coating for reducing the reflectivity thereof by using interference effects of light.

In conventional anti-glare techniques, as a method for roughening the surface of an anti-glare film, a method in which the surface of a substrate is directly roughened by a sandblasting method, an embossment method, etc.; a method in which a hard coat layer containing fillers is formed on the surface of a substrate; and a method in which a porous film is formed on the surface of a substrate by using a sea-island structure; etc., can be mainly used. Additionally, in a conventional anti-reflection technique, a method in which an anti-reflection film is formed by sputtering, etc., can be mainly used. However, a vacuum film forming method such as the latter sputtering, etc., is expensive and has insufficient adhesion with a plastic film, and it is difficult to form a film in which large areas are uniform, and therefore, recently a method in which multiple layers having different refractive indexes, respectively, are laminated by a wet coating, is used. Reflectivity of an antireflection film produced by the sputtering is usually 0.3% or less; however, reflectivity of a film produced by the wet coating is higher than that by the wet coating, and most may be about 1.0%, and this is called a low-reflection to distinguish it from the anti-reflection.

A low-reflection film produced by the wet coating has a standard structure in which a high refractive index layer and a low refractive index layer are laminated in this order on a substrate, and some optional layers may be added between the substrate and the high refractive index layer, between the high refractive index layer and the low refractive index layer, or on the low refractive index layer, as necessary. Here, the high refractive index and the low refractive index do not express absolute refractive indexes, and express higher or lower in refractive index in the case in which refractive indexes of two layers are relatively compared, and the reflectivity is lowest when both refractive indexes have the relationship in the following equation 1.

$$n_2 = (n_1)^{1/2} \quad \text{(equation 1)}$$

($n_1$ is the refractive index of a high refractive index layer, and $n_2$ is the refractive index of a low refractive index layer.)

In general, in material for a high refractive index layer of the low-reflection film produced by the wet coating, the refractive index is increased by using an organic polymer which contains the elements chlorine, bromine, sulfur, etc., or by dispersing ultrafine particles of metal oxide having high refractive index such as those of titania, zirconium oxide, zinc oxide, etc., in the layer. In addition, in the low refractive index layer, the refractive index is reduced by using fluorine containing organic polymers or silica, magnesium fluoride, etc., having low refractive index, or by forming holes using fine particles so as to mix.

In recent years, displays used in large screen TVs are in great demand, and as a result, low-reflection films produced by the wet coating are also in great demand. As a low-reflection film, a two-layer type structure in which a hard coat layer combining a function as a high refractive index layer, and a low refractive index layer are provided on a transparent film made of polyethylene terephthalate (PET), triacetylcellulose (TAC), etc., and a three-layer type structure in which a hard coat layer, a high refractive index layer, and a low refractive index layer are provided on the transparent film, are produced and have been sold. In the low-reflection film, high abrasion resistance, chemical resistance and contamination resistance, are required in addition to low reflectivity, and recently, antistatic property is also required on the surface thereof. The antistatic property is required by a demand of the market to prevent dust from adhering due to electrostatic charge, and moreover, improves wiping property of adhered dust, and surface electric resistance is required to be $10^7$ to $10^{11}$ Ω/sq. The Ω/sq is a unit of surface resistance.

In order to give the antistatic property on the surface of an anti-glare film, it is necessary to give the antistatic property in any one layer or some layers of a hard coat layer, a high refractive index layer, and a low refractive index layer as well as the case of the above low-reflection film. As a material for giving the antistatic property, surfactants, electroconductive polymers, electroconductive inorganic fine particles, etc., are used, and in particular, a method in which electroconductive inorganic fine particles are dispersed into a coating film is mainly utilized, since it is effective for reducing electrical resistance.

It is preferable that the electroconductive inorganic fine particles be disposed nearest the surface from the viewpoint of the antistatic property; however, since these materials generally have a high refractive index, it is preferable that the materials be contained in a layer which is provided under the low refractive index layer and conductivity and high refractive index be given considering the anti-reflection.

As an example of the above anti-reflection, Japanese Unexamined Patent Application Publication No. 2003-294904 discloses anti-reflection structures having a two-layer type structure (electroconductive layer/low refractive index layer) or a three-layer type structure (electroconductive layer/high refractive index layer/low refractive index layer), and it is described that transparent conductive ultrafine particles of metal oxide are dispersed in the electroconductive layer, and that the particles include needle shaped or globular fine particles of antimony doped tin oxide and aluminum doped zinc oxide. In addition, Japanese Unexamined Patent Application Publication No. 2002-167576 discloses an electroconductive material composition having high refractive index which includes electroconductive fine particles (A component), dielectric fine particles (B component) having a refractive index of 2.0 or more, and binder (C component), and in which the contents of the B component and C component are 5 to 100 weight parts to 100 weight parts of the A component, respectively. It is described that the electroconductive fine particle is chosen from indium tin oxide, tin oxide, antimony tin oxide, and zinc aluminum oxide. Furthermore, Japanese Unexamined Patent Application Publication No. 2001-302945 discloses a UV curable transparent conductive coating material composition that includes tetragonal tin oxide fine particles produced by a plasma method, acrylate compound, and alcohols.

Other patent applications disclose antistatic and high refractive index of anti-glare films; however, an anti-glare film in which low reflectivity, antistatic properties, abrasion resistance, chemical resistance, contamination resistance, etc., are balanced, has still not been realized.

In addition, as a method for giving simultaneously these functions such as low reflectivity, antistatic, abrasion resistance, chemical resistance, and contamination resistance, films in which layers are laminated have been developed; however, formation of multiple layers requires a process for coating on a substrate any number of times and production cost is increased. Furthermore, it is difficult to adjust the balance between each layer by the formation of multiple layers, and in practice, some of these functions is merely chosen depending on the intended use.

SUMMARY OF THE INVENTION

The present invention has been made in view of the above circumstances, and it is an object thereof to provide an anti-glare film which is superior in low reflectivity and economy, and which balances conductivity, abrasion resistance, and contamination resistance, by providing a hard coat layer and another layer, or a hard coat layer, a high refractive index layer, and a low refractive index layer, on a transparent substrate.

A first embodiment of an anti-glare film according to the present invention includes a transparent substrate, and at least a hard coat layer, a high refractive index layer, and a low refractive index layer provided on the transparent substrate, in which the high refractive index layer contains radiation curable resin composition containing electroconductive inorganic ultrafine particles, and has a refractive index after curing of 1.6 to 1.8, the low refractive index layer contains fluorine containing polysiloxane, and has a refractive index after curing of 1.36 to 1.42, and the electroconductive inorganic ultrafine particle is at least one selected from tin oxide, indium tin oxide (ITO), and zinc oxide, and is contained at 75% or more by weight ratio in the high refractive index layer.

A second embodiment of an anti-glare film according to the present invention includes a transparent substrate, and at least a hard coat layer and a low refractive index layer provided on the transparent substrate, wherein the hard coat layer contains a radiation curable resin composition containing electroconductive inorganic ultrafine particles, has a thickness of 1.0 to 5.0 μm, and has a refractive index after curing of 1.6 to 1.8, the low refractive index layer contains fluorine containing polysiloxane, and has a refractive index after curing of 1.36 to 1.42, and the electroconductive inorganic ultrafine particle is at least one selected from tin oxide, indium tin oxide (ITO), and zinc oxide, and is contained at 75% or more by weight ratio in the hard coat layer.

Here, a "hard coat layer" in the present invention means a layer having a hardness of H or more according to a pencil hardness test (Japanese Industrial Standard K5400). In additional, the high refractive index and the low refractive index express higher or lower in refractive index in the case in which refractive indexes of adjacent layers are relatively compared.

Furthermore, in the anti-glare film of the present invention, surface resistance measured on the surface of the low refractive index layer is preferably less than $10^{11}$ Ω/sq.

Additionally, in the anti-glare film of the present invention, average reflectivity is preferably 1% or less, and total light transmittance is preferably 90% or more, and the HAZE value is preferably 2% or less.

Furthermore, in the anti-glare film of the present invention, the change in the amount of the HAZE value during abrasion resistance testing using steel-wool is preferably 0.5% or less.

In addition, in the anti-glare film of the present invention, it is preferable that the hard coat layer contain transparent resin fine particles and have a rough surface on the surface thereof.

Furthermore, in the first embodiment of the anti-glare film of the present invention, the hard coat layer preferably has a refractive index after curing of 1.45 to 1.55.

BEST MODE FOR CARRYING OUT THE INVENTION

In the following, each component in the anti-glare film of the present invention will be explained in the first embodiment and the second embodiment, respectively.

1. First Embodiment

The first embodiment of the anti-glare film according to the present invention includes a transparent substrate, and at least a hard coat layer, a high refractive index layer, and a low refractive index layer provided on the transparent substrate, in which the high refractive index layer contains a radiation curable resin composition containing electroconductive inorganic ultrafine particles, and has a refractive index after curing of 1.6 to 1.8, the low refractive index layer contains fluorine containing polysiloxane, and has a refractive index after curing of 1.36 to 1.42, and the electroconductive inorganic ultrafine particle is at least one selected from tin oxide, indium tin oxide (ITO), and zinc oxide, and is contained at 75% or more by weight ratio in the high refractive index layer.

According to such a composition, the first embodiment of the anti-glare film of the present invention has an effect that low reflectivity, conductivity, abrasion resistance, and contamination resistance are balanced.

As a transparent substrate used in the anti-glare film of the present invention, glass such as fused silica, soda glass, etc., can be used, and moreover, various resin films such as PET, TAC, polyethylene naphthalate (PEN), polymethyl methacrylate (PMMA), polycarbonate (PC), polyimide (PI), polyethylene (PE), polypropylene (PP), polyvinyl alcohol (PVA), polyvinyl chloride (PVC), cycloolefin copolymer (COC), norbornene containing resin, polyether sulfone, cellophane, aromatic polyamide, etc., can be preferably used. In the case in which the anti-glare film is used for a plasma display and a liquid crystal display, PET or TAC film can be preferably used.

The higher the transparency of the transparent substrate, the better the transparent substrate. The light transmittance (Japanese Industrial Standard K7361-1) is preferably 80% or more, and is more preferably 90% or more. The transparent substrate is preferably thin from the viewpoint of illumination, and furthermore, it is preferably 1 to 700 μm and is more preferably 25 to 250 μm in consideration of productivity and handling.

In addition, the adhesion between the transparent substrate and the hard coat layer can be improved by surface-treatment of the transparent substrate such as an alkaline treatment, corona treatment, plasma treatment, sputtering treatment, etc.; a coating of a surface active agent, a silane coupling agent, etc., or a surface-modification-treatment such as a Si deposition, etc., on the transparent substrate.

As resin for forming the hard coat layer in the first embodiment of the anti-glare layer of the present invention, a resin cured by means of radiation or heat, or a combination thereof, can be used. As a radiation curable resin, compounds appropriately mixed with monomers, oligomers, or prepolymers having polymeric unsaturated bonds such as for an acryloyl group, methacryloyl group, acryloyloxy group, methacryloyloxy group, etc., can be employed. As a monomer, styrene, methyl acrylate, methyl methacrylate, methoxy polyethylene methacrylate, cyclohexyl methacrylate, phenoxy ethyl methacrylate, ethylene glycol dimethacrylate, dipentaerythritol hexaacrylate, trimethylolpropane trimethacrylate, etc., can be mentioned. As an oligomer or prepolymer, an acrylate such as polyester acrylate, polyurethane acrylate, epoxy acrylate, polyether acrylate, alkyd acrylate, melamine acrylate, silicone acrylate, etc., an unsaturated polyester, an epoxy-type compound, etc., can be mentioned. These can be employed alone or in combination. In the case in which flexibility of the curing film is required, the amount of monomer employed is reduced. Furthermore, in order to reduce cross-linking density, it is preferable that an acrylic monomer having a mono-functional or bi-functional acrylate be employed. Whereas in the case in which superior durability such as thermal resistance, abrasion resistance, solvent resistance, etc., is required in the curing film, it is preferable that the amount of the monomer be increased or that an acrylic monomer having a tri-functional or greater acrylate be employed.

In order to cure the radiation curable resin as described above, for example, it is necessary that radiation such as UV, electron beams, X-rays, etc., be irradiated on the resin, and a polymerization initiator can be appropriately added to the resin, as necessary. As a polymerization initiator, any compounds in which activated radicals or cations are generated by heating or irradiation of an energy ray such as visible light, ultraviolet light, etc., can be used without specific limitation. As a polymerization initiator in which activated radicals are generated by heating, azo compounds such as 2,2'-azobis (2,4-dimethyl valeronitrile), etc., and organic peroxides such as benzoyl peroxide, lauroyl peroxide, etc., can be mentioned. As a polymerization initiator in which activated radicals are generated by irradiation of energy rays, an acetophenone such as diethoxy acetophenone, 2-hydroxy-2-methyl-1-phenylpropan-1-one, benzyl dimethyl ketal, 1-hydroxycyclohexyl-phenylketone, 2-methyl-2-monophorino(4-thiomethylphenyl)propan-1-one, or the like; a benzoin ether such as benzoin methylether, benzoin ethylether, benzoin isopropylether, benzoin isobutylether, or the like; a benzophenone such as benzophenone, o-benzoyl methyl benzoate, 4-phenyl benzophenone, 4-benzoyl-4'-methyl-diphenylsulfide, 4-benzoyl-N,N-dimethyl-N-[2-(1-oxo-2-propenyloxy) ethyl] benzene methanaminium bromide, (4-benzoylbenzyl) trimethyl ammonium chloride, or the like; a thioxanthone such as 2,4-diethyl thioxanthone, 1-chloro-4-dichloro thioxanthone, or the like; 2,4,6-trimethylbenzoyl diphenylbenzoyl oxide, or the like; can be mentioned. Additionally, as a polymerization initiator in which a cation is generated, triphenylsulfonium hexafluorophosphate antimonate, tris (4-methoxyphenyl) sulfonium hexafluorophosphate, etc., can be used.

These can be employed alone or in combination. In addition, as an accelerator (sensitizer), an amine-type compound such as N,N-dimethyl paratoluidine, 4,4'-diethylamino benzophenone, or the like, can be employed in combination. The content of the polymerization initiator is preferably in an amount of 0.1 to 10.0% by weight and is more preferably in an amount of 3 to 7% by weight, to the radiation curable resin. In the case in which the content of the polymerization initiator is excessive, unreacted polymerization initiator is decomposed and decomposed fragments cause a reduction in strength of the layer and coloring of the resin. In contrast, in the case in which the content is too low, it is difficult to cure the resin. In the polymerization initiator in which activated radicals are generated by irradiation of energy rays such as visible light, ultraviolet light, etc., it is necessary to increase the content of the polymerization initiator when filler having an absorption in the irradiation wavelength region of the energy ray is used.

The volumetric shrinkage ratio associated with the curing of the hard coat layer employing the above radiation curable resin (calculated by the following method) is preferably 20% or less. With a volumetric shrinkage ratio of 20% or more, in the case of a film-shaped transparent substrate, the film will curl severely, and in the case of a rigid substrate such as a glass or the like, the adhesion between the substrate and the hard coat layer will be reduced.

$$\text{Volumetric shrinkage ratio: } D=(S-S')/S \times 100 \quad \text{(equation 2)}$$

In which

S: specific gravity before curing

S': specific gravity after curing (Specific gravity is measured by the B method picnometer method of Japanese Industrial Standard K-7112.)

In the hard coat layer in the first embodiment, a stabilizer (a thermal polymerization inhibitor) for the radiation curable resin such as hydroquinone, p-benzoquinone, t-butylhydroquinone, etc., may be added. It is preferred that the stabilizer be employed in a range of 0.1 to 5.0% by weight relative to that of the radiation curable resin.

As a thermosetting resin which can be used in the hard coat layer, phenol resin, furan resin, xylene-formaldehyde resin, ketone-formaldehyde resin, urea resin, melamine resin, aniline resin, alkyd resin, unsaturated polyester resin, epoxy resin, etc., can be employed. These may be employed alone or in combination. In the case in which a transparent substrate consists of plastics, the heat curing temperature cannot be set at a high temperature. In particular, in the case in which PET or TAC is employed, a thermosetting resin which can be cured at 100° C. or less is desirably employed.

It is preferable that the curable resin which is employed in the hard coat layer have a higher transparency. The light permeability (Japanese Industrial Standard K-7361-1) is preferably 80% or more, and more preferably 90% or more, similarly to the case of the transparent substrate. The refractive index of the hard coat layer is preferably in a range of 1.45 to 1.55. When it deviates from the above range, suitable anti-reflection property cannot be obtained.

In the present invention, as a method for forming a hard coat layer, directly or via another layer, on one surface or both surfaces of the transparent substrate, there can be mentioned a method consisting of the steps of: mixing fillers, water, or organic solvent in the resin for forming a hard coat layer described above as necessary; dispersing the mixture using a paint shaker, sand mill, pearl mill, ball mill, attritor, roll mill, high-speed impeller disperser, jet mill, high-speed impact mill, ultrasonic disperser, or the like, to form a coating material or an ink; providing one layer or the same layers on one surface or both surfaces of the transparent substrate by means of a printing method such as a letterpress printing method such as a flexographic printing method or the like, an intaglio printing method such as a direct gravure printing method, offset gravure printing method, or the like, a planographic printing method such as an offset printing method or the like, a stencil printing method such as a screen process printing method or the like, or a coating method such as an air doctor coating method, blade coating method, knife coating method, reverse coating method, transfer roll coating method, gravure roll coating method, kiss coating method, cast coating method, spray coating method, slot orifice coating method, calender coating method, electrodeposition coating method, dip coating method, die coating method or the like; thermal-drying the coating or printing layers in the case where a solvent is included; and curing the coating or printing layers by means of radiation (in the case of UV radiation, a photo-polymerization initiator is necessary). In the case in which the radiation is an electron beam, an electron beam having an energy of 50 KeV to 1000 KeV emitted from various electron beam accelerators such as a Cockroft-Walton apparatus, Van de Graff apparatus, resonance transformer apparatus, insulating core transformer apparatus, linear type apparatus, dynamitron type apparatus, high-frequency type apparatus, or the like may be employed. In the case where the radiation is UV radiation, the UV radiation emitted from the light of an extra-high pressure mercury vapor lamp, high pressure mercury vapor lamp, low pressure mercury vapor lamp, carbon arc lamp, xenon arc lamp, metal halide lamp, or the like can be employed.

In order to improve the coating aptitude or printing aptitude of a coating material or an ink, a levelling agent such as silicone oil or the like, fats and oils such as polyethylene wax, carnauba wax, higher alcohols, bisamide, higher fatty acids, or the like, a curing agent such as isocyanate or the like, an additive such as ultra-microparticles having a particle size of 0.1 μm or less, such as those of calcium carbonate, silica sol, synthetic mica, or the like, can be employed, as necessary.

The thickness of the hard coat layer is preferably in a range of 1.0 to 10.0 μm, and more preferably in a range of 1 to 5 μm. In the case in which the thickness of the hard coat layer is less than 1.0 μm, abrasion resistance of the hard coat layer is degraded, or in the case of a UV-curable resin being employed in the hard coat layer, the resin fails to cure due to oxidation inhibition. In contrast, in the case in which the thickness of the hard coat layer is more than 10 μm, curling occurs due to curing-shrinkage of the resin, microcracking occurs in the hard coat layer, or the adhesion between the transparent substrate and the hard coat layer is decreased.

In the present invention, a fine rough surface is formed on the surface of the hard coat layer by dispersing and containing transparent resin fine particles in the hard coat layer, and anti-glare properties are thereby produced. As a transparent resin fine particle used here, organic transparent particles made of acrylic resin, polystyrene resin, styrene-acrylic copolymer, polyethylene resin, epoxy resin, silicone resin, polyvinylidene fluoride, polyethylene fluoride resin, etc., can be used. The refractive index of the transparent resin fine particle is preferably 1.40 to 1.75, and in the case in which the refractive index is less than 1.40 or more than 1.75, difference of refractive indexes between the transparent resin fine particle and the hard coat layer or the transparent base substance is too large, and light permeability is reduced. The particle diameter of the transparent particle is preferably 0.3 to 10 μm, and is more preferably 1 to 5 μm. In the case in which the particle diameter is less than 0.3 μm, anti-glare properties are reduced, and in contrast, in the case in which it is more than 10 μm, glare is generated, and the surface of the layer appears to be fogged by increasing roughness of the surface.

In order to further improve the anti-reflection effect, a high refractive index layer can be provided between the hard coat layer and the low refractive index layer. Here, the refractive index of the high refractive index layer is higher than those of the hard coat layer and the low refractive index layer.

The high refractive index layer in the first embodiment of the anti-glare film of the present invention must have a higher refractive index than the low refractive index layer formed over the layer, and the refractive index is preferably 1.60 to 1.80. In the case in which the refractive index is less than 1.60, it is difficult to obtain sufficient low reflection effect, and in contrast, in the case in which it is more than 1.80, it is difficult to form a film.

The thickness of the high refractive index layer is preferably equal to or less than the wavelength of visible light. For example, in the case in which antireflection effect is given in visible light, the thickness of the high refractive index layer is designed so that nd is satisfied $500 \leq 4nd$ (nm) $\leq 750$. Here, n is refractive index of the high refractive index layer, and d is thickness of the layer. In the present invention, since the high refractive index layer is thin as described above, sufficient hard coat property cannot be obtained. Therefore, it is necessary to provide the hard coat layer between the high refractive index layer and the transparent base substance.

As an electroconductive inorganic ultrafine particle contained in the high refractive index layer, tin oxide, phosphorus-doped tin oxide, antimony-doped tin oxide (ATO), indium tin oxide (ITO), indium oxide, zinc oxide, aluminum-doped zinc oxide, and antimony pentoxide, can be used, and among them, tin oxide, ITO, and zinc oxide are preferable. These compounds not only give conductivity but also increase refractive index of the high refractive index layer which contains these compounds, since these compounds have high refractive indexes of about 2.0.

Particle diameter of these electroconductive inorganic ultrafine particles is preferably 1 to 300 nm, is more preferably 5 to 100 nm, and is most preferably 5 to 50 nm. In the case in which the particle diameter is less than 1 nm, it is difficult to uniformly disperse, and in contrast, in the case in which it is more than 300 nm, transparency is reduced.

As a radiation curable resin component, used in the high refractive index layer, compounds appropriately mixed with monomers, oligomers, or prepolymers having radical polymeric functional groups such as an acryloyl group, methacryloyl group, acryloyloxy group, methacryloyloxy group, etc., or having cationic polymeric functional groups such as epoxy group, vinyl ether group, oxetane group, etc., can be employed. As a monomer, methyl acrylate, methyl methacrylate, methoxy polyethylene methacrylate, cyclohexyl methacrylate, phenoxyethyl methacrylate, ethylene glycol dimethacrylate, dipentaerythritol hexaacrylate, trimethylolpropane triacrylate, etc., can be used. As an oligomer or prepolymer, acrylate compounds such as polyester acrylate, polyurethane acrylate, epoxy acrylate, polyether acrylate, alkyd acrylate, melamine acrylate, silicone acrylate, etc.; unsaturated polyester, tetramethylene glycol diglycidyl ether, propylene glycol diglycidyl ether, neopentyl glycol diglycidyl ether, bisphenol-A diglycidyl ether; epoxy-type compounds such as various alicyclic epoxies, etc.; oxetane compounds such as 3-ethyl-3-hydroxymethyl oxetane, 1,4-bis{[(3-ethyl-3-oxetanyl) methoxy]methyl}benzene, di[1-ethyl (3-oxetanyl)]methyl ether, etc.; can be used. These can be employed alone or in combination.

The above radiation curable resin components can be cured by simply irradiation of electron beam; however, a photopolymerization initiator must be added in the case of curing by irradiation by ultraviolet light. As a photopolymerization initiator, a radical polymerization initiator such as acetophenones, benzophenones, thioxanthones, benzoin, benzoin methyl ether, etc.; cationic polymerization initiator such as aromatic diazonium salts, aromatic sulfonium salts, aromatic iodonium salts, metallocene compounds, etc., can be used alone or in combination.

In the present invention, polymeric resins can be added to the above radiation curable resin component unless polymerized curing is not prevented. The polymeric resins are thermoplastic resins which are soluble in organic solvent used in a hard coat layer coating material as described below, and specifically acrylic resin, alkyd resin, polyester resin, etc., can be used, and it is preferable to have an acidic functional group such as a carboxyl group, phosphate group, sulfonate group, etc., so as to increase affinity with the electroconductive inorganic ultrafine particles.

In addition, in the present invention, the surface of the electroconductive inorganic ultrafine particle can be modified by various coupling agents as necessary, so as to stably disperse the electroconductive inorganic ultrafine particle into the above radiation curable resin component. As a coupling agent, silane coupling agent; metalalkoxide such as aluminum, titanium, zirconium, etc.; organic acid such as fatty acid, etc., and salt thereof; and phosphates; or the like, can be used.

The content of the electroconductive inorganic ultrafine particle in the high refractive index layer is preferably 75% by weight or more, is more preferably 75 to 95% by weight, and is most preferably 80 to 90% by weight. In the case in which the content is less than 75% by weight, it is difficult to obtain superior conductivity, and in contrast, in the case in which it is more than 95% by weight, the HAZE value is increased and abrasion resistance of the high refractive index layer is reduced.

The high refractive index layer is constituted by curing mainly the above electroconductive inorganic ultrafine particles and the radiation curable resin component, and a method for forming the layer includes coating coating material including electroconductive inorganic ultrafine particles, radiation curable resin component, and organic solvent; and curing the material by irradiation with an electron beam or ultraviolet light, after evaporating the organic solvent. The organic solvent used here must dissolve suitably the radiation curable resin component and disperse suitably the electroconductive inorganic ultrafine particles. Specifically, it is possible to use alcohols, esters, ketones, ethers, and aromatic hydrocarbons can be used alone or in combination, considering coating properties such as wettability on a substrate, viscosity, and drying rate.

Surface resistance of a laminate from the substrate to the high refractive index layer in the first embodiment of the anti-glare film of the present invention is preferably $10^7$ to $10^9$ Ω/sq. In order to have superior antistatic properties, surface resistance must be $10^7$ Ω/sq or more, and in contrast, in the case in which the surface resistance is more than $10^9$ Ω/sq, surface resistance on the surfacemost of an anti-glare film in which a low refractive index layer is provided on the laminate is $10^{11}$ Ω/sq or more, and therefore, sufficient antistatic properties cannot be exhibited. In addition, surface hardness of the high refractive index layer is preferably hardness H or more measured by a pencil hardness test (Japanese Industrial Standard K5600-5-4), and is more preferably hardness 2H or more.

A low refractive index layer provided on the high refractive index layer in the first embodiment of the anti-glare film of the present invention is composed of fluorine containing polysiloxane. The fluorine containing polysiloxane is mixture of at least a hydrolyzable silicon compound and/or hydrolyzate thereof with a curing accelerator. As a hydrolyzable silicon compound, a mixture of at least one of the silicon compounds shown in the following chemical formulas 1 to 3 with at least one of the fluorine containing polysiloxanes shown in the chemical formulas 4 and 5, can be used.

Chemical Formulas

$R^1{}_a$—Si$X_{4-a}$ $0 \leq a \leq 2$ (chemical formula 1)

$X_3$Si—$R^2$—Si$X_3$ (chemical formula 2)

Y—(Si(OR$^3$)$_2$O)$_n$—Y (chemical formula 3)

$R^5{}_a$—Si$X_{4-a}$ $1 \leq a \leq 2$ (chemical formula 4)

$X_3$Si—$R^6$—Si$X_3$ (chemical formula 5)

(X is any of Cl, Br, NCO, OR$^4$. Y is H or an organic group having a carbon number of 1 to 20. $R^1$, $R^2$, $R^3$ or $R^4$ is an organic group having a carbon number of 1 to 20. $R^5$ or $R^6$ is an organic group including at least one fluorine atom. n is integer of 1 to 30.)

As a specific example of a hydrolyzable silicon compound, silicon compounds in which a silicon atom has four hydrolyzable groups, can be used. Specifically, tetramethoxy silane, tetraethoxy silane, tetra (1-propoxy) silane, tetra (2-propoxy) silane, tetra (1-butoxy) silane, tetrachloro silane, tetrabromo silane, tetraisocyanate silane, dimethoxy siloxane oligomer, diethoxy siloxane oligomer, etc., can be used; however, the present invention is not limited to these compounds. In addition, as a fluorine containing silicon compound, 3,3,3-trifluoroprolyl trimethoxy silane, 3,3,3-trifluoroprolyl triethoxy silane, 3,3,3-trifluoroprolyl tripropoxy silane, 3,3,3-trifluoroprolyl trichloro silane, 3,3,3-trifluoroprolyl triisocyanate, 1H,1H,2H,2H-tetrahydro perfluorohexyl trimethoxysilane, 1H,1H,2H,2H-tetrahydro perfluorohexyl triethoxysilane, 1H,1H,2H,2H-tetrahydro perfluorohexyl tripropoxysilane, 1H,1H,2H,2H-tetrahydro perfluorohexyl trichlorosilane, 1H,1H,2H,2H-tetrahydro perfluorohexyl triisocyanatesilane, 1H,1H,2H,2H-tetrahydro perfluorononyl trimethoxysilane, 1H,1H,2H,2H-tetrahydro perfluorononyl triethoxysilane, 1H,1H,2H,2H-tetrahydro perfluorononyl tripropoxysilane, 1H,1H,2H,2H-tetrahydro perfluorononyl trichlorosilane, 1H,1H,2H,2H-tetrahydro perfluorononyl triisocyanatesilane, 1H,1H,2H,2H-tetrahydro perfluorodecyl trimethoxysilane, 1H,1H,2H,2H-tetrahydro perfluorodecyl triethoxysilane, 1H,1H,2H,2H-tetrahydro perfluorodecyl tripropoxysilane, 1H,1H,2H,2H-tetrahydro perfluorodecyl trichlorosilane, 1H,1H,2H,2H-tetrahydro perfluorodecyl triisocyanatesilane, 1-heptafluoro isopropoxy propyl trimethoxysilane, 1-heptafluoroisopropoxypropyl triethoxysilane, 1-heptafluoroisopropoxypropyl tripropoxysilane, 1-heptafluoroisopropoxypropyl trichlorosilane, 1-heptafluoroisopropoxypropyl triisocyanatesilane, 1,4-bis (trimethoxysilyl)-2,2,3,3-tetrafluorobutane, 1,5-bis (trimethoxysilyl)-2,2,3,3,4,4-hexafluoropentane, etc., can be used. Of these, 1H,1H,2H,2H-tetrahydro perfluorodecyl triethoxysilane is preferable from the viewpoint of refractive index, reactivity, and solvent solubility.

In addition, as a hydrolyzable silicon compound in the present invention, cation-modified silicon compounds which function as a film coating agent and a antistatic agent, can be added in addition to the above compounds. Specifically, as a cation-modified silicon compound, octadecyl dimethyl [3-(trimethoxysilyl) propyl] ammonium chloride, N-(3-trimethoxysilylpropyl)-N-methyl-N,N-diallyl ammonium chloride, N,N-didecyl-N-methyl-N-(3-trimethoxysilylpropyl) ammonium chloride, octadecyl dimethyl (3-trimethoxysilylpropyl) ammonium chloride, tetradecyl dimethyl (3-trimethoxysilylpropyl) ammonium chloride, N-trimethoxysilylpropyl-N,N,N-tri-n-butyl ammonium chloride, N-trimethoxysilylpropyl-N,N,N-trimethyl ammonium chloride, trimethoxysilylpropyl (polyethyleneimine), dimethoxymethylsilylpropyl modified (polyethyleneimine), etc., can be mentioned.

In order to balance refractive index and coating film strength of the low refractive index layer, of the above hydrolyzable silicon compounds, silicon compounds in which silicon atom has four hydrolyzable groups (compounds in which $\alpha$ is 0 in the chemical formula 1) and fluorine containing hydrolyzable silicon compounds can be preferably used in combination appropriately. In this case, although the mixing ratio is different depending on type of silicon compound, the fluorine containing hydrolyzable silicon compound is contained at preferably 1 to 500 weight parts and more preferably 20 to 300 weight parts to 100 weight parts of the silicon compound in which a silicon atom has four hydrolyzable groups.

Usually, the above hydrolyzable silicon compound is partially hydrolyzed and polycondensed by dissolving in alcohol solvent, and after coating, it is further polycondensed by heating, so as to form a cured film. In order to promote these hydrolyses and polycondensation reactions, curing accelerators can be added at 1 to 30 weight parts to 100 weight parts of the hydrolyzable silicon compound analogue and/or hydrolyzate thereof. As a curing accelerator, mineral acids such as nitric acid, hydrochloric acid, etc.; organic acids such as oxalic acid, acetic acid, etc.; acidic catalysts such as orthophosphoric acid, benzenesulfonic acid, p-toluene sulfonic acid, etc.; and basic catalysts such as ammonia, etc., can be used.

These curing accelerators can be directly coated after mixing with the silicon compound, so as to form a film. Additionally, the silicon compound is previously hydrolyzed by adding water, and then, after mixing with the hydrolyzed silicon compound, the curing accelerators may be coated, so as to form a film. In this case, a mixture of silicon compound, water, and solvent, or a mixture into which is added a small amount of a strong acid (hydrochloric acid, etc.) thereto is prepared, and after being allowed to stand at room temperature for several hours or a few days, it is diluted to a concentration for coating and is added with the curing accelerator, and it is coated so as to form a film. In addition, after the silicon compound is polymerized to be an oligomer in the absence of water using a silane polymerization catalyst such as oxalic acid, etc., the oligomer may be added with the curing accelerator and be coated applied so as to form a film. In this case, a mixture of silicon compound, solvent, and carboxylic acid catalyst is heated from room temperature to 100° C., and in the same manner as that in other cases, it is diluted to a concentration for coating and is added with the curing accelerator, and it is coated so as to form a film.

The low refractive index layer is produced by the following processes: coating material preparation, coating, drying, polymerization, and curing. Coating material for forming the low refractive index layer can be prepared by dissolving the above silicon compound in an optional solvent, hydrolyzing and polymerizing to be oligomer, as necessary, and mixing the above curing accelerator. In this case, in order to obtain a desired thickness of coating film, the content of the silicon compound is usually prepared at 0.1 to 50 weight % and preferably 0.5 to 30 weight %. As a solvent, it is necessary to contain polar solvent which can dissolve at least the hydrolyzed silicon compound. Additionally, it is preferable that the boiling point of the solvent be 50 to 150° C. from the viewpoint of evaporation during drying. As such solvents, alcohols such as methanol, ethanol, 1-propanol, 2-propanol, butanol, etc.; glycols such as ethylene glycol, propylene glycol, hexylene glycol, etc.; glycol ethers such as ethylcellosolve, butylcellosolve, ethyl carbitol, butyl carbitol, diethyl cellosolve, diethyl carbitol, etc.; ketones such as acetone, methyl ethyl ketone, methyl isobutyl ketone, etc.; esters such as methyl acetate, ethyl acetate, propyl acetate, butyl acetate, etc.; aromatic hydrocarbons such as benzene, toluene, xylene, etc.; nitrogen containing compounds such as N-methylpyrrolidone, dimethyl formamide, etc.; and halogenated hydrocarbons such of chloroform, dichloromethane, trichloroethylene, etc., can be used, and the present invention is not limited to these. In addition, the solvent can be used alone or in combination.

The low refractive index layer can be provided on one surface or both surfaces of the transparent substrate by coating or printing methods, using the coating material prepared as above. Specifically, coating methods such as an air doctor coating method, blade coating method, wire doctor coating method, knife coating method, reverse coating method, transfer roll coating method, gravure roll coating method, microgravure coating method, kiss coating method, cast coating method, spray coating method, slot orifice coating method, calender coating method, electrodeposition coating method, dip coating method, die coating method, etc.; and printing methods such as letterpress printing methods such as flexographic printing method, etc., intaglio printing methods such as direct gravure printing method, offset gravure printing method, etc., planographic printing methods such as offset printing method, etc., stencil printing methods such as screen process printing method, etc., can be used. Here, thickness of the low refractive index layer formed as above may be properly decided considering the relationship between refractive index and wavelength of light; it is not particularly limited, and it is preferably 70 to 120 nm. In the case in which the thickness is in the above range, surface resistance of the low refractive index layer can be less than $10^{11}$ Ω/sq, since it is one figure larger than that of the hard coat layer that is disposed at the lower side.

In the processes of drying, polymerization, and curing of a coating film for the low refractive index layer, it is necessary that the solvent be evaporated by heating and that the coating film be cured by further heating. Heating temperature is preferably 40° C. or more, and is more preferably 80 to 120° C. The upper limit of the heating temperature differs depending on the substance used; however, in the case in which a general transparent film is used, the transparent firm becomes soft at more than 120° C. and cannot be used in practice.

The surface resistance of the low refractive index layer is preferably less than $10^{11}$ Ω/sq, and is more preferably $10^{10}$ Ω/sq or less. In the case in which it is $10^{11}$ Ω/sq or more, sufficient antistatic properties cannot be exhibited.

With respect to refractive indexes among the hard coat layer, the high refractive index layer and the low refractive index layer in the anti-glare film of the present invention, it is preferable that the refractive index of the hard coat layer after curing be 1.45 to 1.55, the refractive index of the high refractive index layer after curing be 1.6 to 1.8, and the refractive index of the low refractive index layer after curing be 1.36 to 1.42. In the case in which these refractive indexes deviate from the above range, the anti-reflection property is reduced.

In the anti-glare film of the present invention, by optimizing the above material and combination thereof, average reflectivity can be 1% or less, total light transmittance can be 90% or more, and the HAZE value can be 2% or less. In addition, the amount of change in the HAZE value on the surface thereof, measured by an abrasion resistance test using steel wool, can be 0.5% or less.

2. Second Embodiment

The second embodiment of the anti-glare film according to the present invention includes a transparent substrate, and at least a hard coat layer and a low refractive index layer provided on the transparent substrate, wherein the hard coat layer contains a radiation curable resin composition containing electroconductive inorganic ultrafine particles, has a thickness of 1.0 to 5.0 μm, and has a refractive index after curing of 1.6 to 1.8, the low refractive index layer contains fluorine containing polysiloxane, and has a refractive index after curing of 1.36 to 1.42, and the electroconductive inorganic ultrafine particle is at least one selected from tin oxide, indium tin oxide (ITO), and zinc oxide, and is contained at 75% or more by weight ratio in the hard coat layer.

According to such a composition, the second embodiment of the anti-glare film of the present invention has an effect in which not only are low reflectivity, conductivity, abrasion resistance, and contamination resistance balanced, but also production costs are reduced by decreasing coating processes.

Each component in the second embodiment of the anti-glare film of the present invention is similar to that in the first embodiment except that the hard coat layer and the high refractive index layer in the first embodiment are replaced with a hard coat layer in the second embodiment, which has both functions of the high refractive index layer in the first embodiment. Therefore, in the following, only the hard coat layer in the second embodiment will be explained.

The hard coat layer in the second embodiment of the anti-glare film of the present invention is a layer having a hardness of H or more according to a pencil hardness test (Japanese Industrial Standard K5400), and the same structure and material as those of the above high refractive index layer in the first embodiment. However, the following points are different.

The thickness of the hard coat layer in the second embodiment is preferably in a range of 1.0 to 5.0 μm, and more preferably in a range of 2.0 to 4.0 μm. In the case in which the thickness of the hard coat layer is less than 1.0 μm, the abrasion resistance of the hard coat layer is degraded, or in the case of a UV-curable resin being employed in the hard coat layer, the resin fails to cure due to oxidation inhibition. In contrast, in the case in which the thickness of the hard coat layer is more than 5.0 μm, curling occurs due to curing-shrinkage of the resin, microcracking occurs in the hard coat layer, the adhesion between the transparent substrate and the hard coat layer is decreased, or optical transparency is reduced. Furthermore, production costs are increased by increasing the coating amount of the coating material with increasing thickness of the film.

In addition, the refractive index after curing of the hard coat layer in the second embodiment is preferably 1.6 to 1.8. In the case in which it is less than 1.6, sufficient anti-reflectivity cannot be achieved, even if a low refractive index layer is provided at upper side thereof. In contrast, in the case in which it is more than 1.8, the difference of refractive indexes between the hard coat layer and the transparent substrate is excessively increased, and interference unevenness is thereby increased when a low refractive index layer is provided.

In the second embodiment, a fine rough surface is formed on the surface of the hard coat layer by dispersing and containing transparent resin fine particles in the hard coat layer, and anti-glare properties are thereby produced. As a transparent resin fine particle used here, organic transparent particles made of acrylic resin, polystyrene resin, styrene-acrylic copolymer, polyethylene resin, epoxy resin, silicone resin, polyvinylidene fluoride, polyethylene fluoride resin, etc., can be used. Refractive index of the transparent resin fine particle is preferably 1.40 to 1.75, and in the case in which the refractive index is less than 1.40 or more than 1.75, differences in refractive indexes between the transparent resin fine particle and the hard coat layer or the transparent base substance are too large, and permeability is reduced. Particle diameter of the transparent particle is preferably 0.3 to 10 μm, and is more preferably 1 to 5 μm. In the case in which the particle diameter is less than 0.3 μm, anti-glare properties are reduced, and in contrast, in the case in which it is more than 10 μm, glare is generated, and the surface of the layer appears to be fogged by increasing roughness of the surface.

EXAMPLES

In the following, the present invention will be explained by Examples. Hereinbelow, "part" means "weight part".

1. First Embodiment

Sample 1

(1) Production of Hard Coat Layer

The following hard coat coating material was applied to a PET film (trade name: A 4300, produced by Toyobo Co., Ltd.) having a thickness of 100 μm by using a reverse coating method, and after drying at 100° C. for 1 minute, the coating was cured in a nitrogen gas atmosphere by irradiation with UV light (irradiation distance: 10 cm, irradiation time: 30 seconds) using a converging type high pressure mercury lamp of 120 W/cm. As a result, a hard coat layer having a thickness of 2.5 μm and a refractive index of 1.52 was produced.

Mixing Ratio of Hard Coat Coating Material 38 parts of UV curable urethane acrylate oligomer (trade name: UV 7600 B, solid concentration: 100%, produced by The Nippon Synthetic Chemical Industry, Co., Ltd.), 2 parts of photoinitiator (trade name: IRGACURE 184, produced by Ciba-Geigy Co., Ltd.), 36 parts of methylethylketone, and 24 parts of cyclohexanone.

(2) Production of High Refractive Index Layer

The following high refractive index coating material was applied to the above hard coat layer by using a reverse coating method, and after drying at 100° C. for 1 minute, the coating was cured by irradiation in a nitrogen gas atmosphere with UV light (irradiation distance: 10 cm, irradiation time: 30 seconds) using a converging type high pressure mercury lamp of 120 W/cm. As a result, a high refractive index layer having a thickness of 0.1 μm and a refractive index of 1.64 was produced.

Mixing Ratio of High Refractive Index Coating Material 7 parts of a polyester resin having an average molecular weight of 65000, an acid value of 7 mg KOH/g, and non-volatile components of 60%, which was produced by reacting neopentylglycol and polybasic acid consisting of isophthalic acid and adipic acid, 1.8 parts of dipentaerythritol tetraacrylate, 34 parts of ITO powder having an average primary particle diameter of 0.05 µm and content of Sn to In of 5 mol %, and 57.2 parts of mixed solvent of n-butanol and xylene at a weight ratio of 4/6.

The above material and 50 cc of glass beads were put into a 250 cc container, and were mixed for 5 hours by a paint shaker. After the mixing, 0.2 parts of photoinitiator (trade name: IRGACURE 907, produced by Ciba-Geigy Co., Ltd.) was dissolved, and a high refractive index coating material was produced.

(3) Production of Low Refractive Index Layer

The following low refractive index coating material was applied to the above high refractive index layer by using a reverse coating method, and the coating was cured by drying at 100° C. for 1 minute.

Mixing Ratio of Low Refractive Index Coating Material 7.9 parts of fluorine containing polysiloxane (trade name: LR 204-1, solid concentration: 6.46%, produced by Nissan Chemical Industries, Ltd.), and 12.1 parts of methyl isobutyl ketone.

Subsequently, the low refractive index layer was cured by heating at 60° C. for 120 hours, and therefore, an anti-glare film of the present invention having a thickness of 0.1 µm, a refractive index of 1.38, and a reflectivity of 0.57% was produced.

Sample 2

(1) Production of Hard Coat Layer

The same hard coat coating material as that of Sample 1 was applied to a PET film (trade name: A 4300, produced by Toyobo Co., Ltd.) having a thickness of 100 µm by using a reverse coating method, and after drying at 100° C. for 1 minute, the coating was cured in a nitrogen gas atmosphere by irradiation with UV light (irradiation distance: 10 cm, irradiation time: 30 seconds) using a converging type high pressure mercury lamp of 120 W/cm. As a result, a hard coat layer having a thickness of 2.5 µm and a refractive index of 1.52 was produced.

(2) Production of High Refractive Index Layer

As a high refractive index coating material, zirconia oxide containing UV curable resin (trade name: KZ7391, solid concentration: 42%, ZrO content in solid component: 68.0%, produced by JSR Corporation) was applied to the above hard coat layer by using a reverse coating method, and after drying at 100° C. for 1 minute, the coating was cured in a nitrogen gas atmosphere by irradiation with UV light (irradiation distance: 10 cm, irradiation time: 30 seconds) using a converging type high pressure mercury lamp of 120 W/cm. As a result, a high refractive index layer having a thickness of 0.1 µm and a refractive index of 1.64 was produced.

(3) Production of Low Refractive Index Layer

The same low refractive index coating material as that of Sample 1 was applied to the above high refractive index layer by using a reverse coating method, and the coating was cured by drying at 100° C. for 1 minute.

Subsequently, the low refractive index layer was cured by heating at 60° C. for 120 hours, and therefore, an anti-glare film for comparison having a thickness of 0.1 µm, a refractive index of 1.38, and a reflectivity of 0.62% was produced.

Sample 3

(1) Production of Hard Coat Layer

The same hard coat coating material as that of Sample 1 was applied to a PET film (trade name: A 4300, produced by Toyobo Co., Ltd.) having a thickness of 100 µm by using a reverse coating method, and after drying at 100° C. for 1 minute, the coating was cured in a nitrogen gas atmosphere by irradiation with UV light (irradiation distance: 10 cm, irradiation time: 30 seconds) using a converging type high pressure mercury lamp of 120 W/cm. As a result, a hard coat layer having a thickness of 2.5 µm and a refractive index of 1.52 was produced.

(2) Production of Low Refractive Index Layer

The same low refractive index coating material as that of Sample 1 was applied to the above hard coat layer by using a reverse coating method, and the coating was cured by drying at 100° C. for 1 minute.

Subsequently, the low refractive index layer was cured by heating at 60° C. for 120 hours, and therefore, an anti-glare film for comparison having a thickness of 0.1 µm, a refractive index of 1.38, and a reflectivity of 2.13% was produced.

Sample 4

(1) Production of Hard Coat Layer

The same hard coat coating material as that of Sample 1 was applied to a PET film (trade name: A 4300, produced by Toyobo Co., Ltd.) having a thickness of 100 µm by using a reverse coating method, and after drying at 100° C. for 1 minute, the coating was cured in a nitrogen gas atmosphere by irradiation with UV light (irradiation distance: 10 cm, irradiation time: 30 seconds) using a converging type high pressure mercury lamp of 120 W/cm. As a result, a hard coat layer having a thickness of 2.5 µm and a refractive index of 1.52 was produced.

(2) Production of High Refractive Index Layer

The same high refractive index coating material as that of Sample 1 was applied to the above hard coat layer by using a reverse coating method, and after drying at 100° C. for 1 minute, the coating was cured in a nitrogen gas atmosphere by irradiation with UV light (irradiation distance: 10 cm, irradiation time: 30 seconds) using a converging type high pressure mercury lamp of 120 W/cm. As a result, a high refractive index layer having a thickness of 0.1 µm and a refractive index of 1.64 was produced.

(3) Production of Low Refractive Index Layer

The following low refractive index coating material was applied to the above high refractive index layer by using a reverse coating method, and the coating was cured by drying at 100° C. for 1 minute.

Mixing Ratio of Low Refractive Index Coating Material 10 parts of silica sol (ethanol dispersion which contains silica ultrafine particles having particle diameter of 15 nm and content of $SiO_2$ of 30 weight %), 15 parts of film forming agent (hydrolyzate of tetraethoxysilane having solid concentration calculated as $SiO_2$ of 6%, and 53 parts of ethanol.

Subsequently, the low refractive index layer was cured by heating at 60° C. for 120 hours, and therefore, an anti-glare film for comparison having a thickness of 0.1 μm, a refractive index of 1.38, and a reflectivity of 0.68% was produced.

Sample 5

(1) Production of Hard Coat Layer

The same hard coat coating material as that of Sample 1 was applied to a PET film (trade name: A 4300, produced by Toyobo Co., Ltd.) having a thickness of 100 μm by using a reverse coating method, and after drying at 100° C. for 1 minute, the coating was cured in a nitrogen gas atmosphere by irradiation with UV light (irradiation distance: 10 cm, irradiation time: 30 seconds) using a converging type high pressure mercury lamp of 120 W/cm. As a result, a hard coat layer having a thickness of 2.5 μm and a refractive index of 1.52 was produced.

(2) Production of High Refractive Index Layer

The following high refractive index coating material was applied to the above hard coat layer by using a reverse coating method, and after drying at 100° C. for 1 minute, the coating was cured in a nitrogen gas atmosphere by irradiation with UV light (irradiation distance: 10 cm, irradiation time: 30 seconds) using a converging type high pressure mercury lamp of 120 W/cm. As a result, a high refractive index layer having a thickness of 0.1 μm and a refractive index of 1.61 was produced.

Mixing Ratio of High Refractive Index Coating Material 14 parts of polyester resin having an average molecular weight of 65000, an acid value of 7 mg KOH/g, and non-volatile components of 60%, which were produced by reacting neopentylglycol and polybasic acid consisting of isophthalic acid and adipic acid, 3.6 parts of dipentaerythritol tetraacrylate, 28 parts of ITO powder having average primary particle diameter of 0.05 μm and content of Sn to In of 5 mol %, and 54.4 parts of mixed solvent of n-butanol and xylene at a weight ratio of 4/6.

The above material and 50 cc of glass beads were put into a 250 cc container and were mixed for 5 hours by a paint shaker. After the dispersion, 0.2 parts of a photoinitiator (trade name: IRGACURE 907, produced by Ciba-Geigy Co., Ltd.) was dissolved, and a high refractive index coating material was produced.

(3) Production of Low Refractive Index Layer

The same low refractive index coating material as that of Sample 1 was applied to the above hard coat layer by using a reverse coating method, and the coating was cured by drying at 100° C. for 1 minute.

Subsequently, the low refractive index layer was cured by heating at 60° C. for 120 hours, and therefore, an anti-glare film for comparison having a thickness of 0.1 μm, a refractive index of 1.38, and a reflectivity of 0.95% was produced.

With regard to the anti-glare films of Samples 1 to 5 as obtained above, total light transmittance, HAZE value, reflectivity, surface electric resistance, abrasion resistance, and contamination resistance, were measured and evaluated by the following methods.

The total light transmittance and the HAZE value were measured using a HAZE meter (trade name: NDH 2000, produced by Japan Electric Color Co., Ltd.).

5 degree specular reflection was measured at wavelengths of 400 to 700 nm, using a spectrophotometer (trade name: UV 3100, produced by Shimadzu Corporation) and was luminosity-corrected in accordance with Japanese Industrial Standard Z-8701, and the reflectivity is shown by a Y value. Here, after the non-measured surface of the film was completely painted with black magic ink, the measurements were carried out.

Surface electric resistance was measured using a surface resistivity meter (trade name: HIRESTA-UP, produced by Mitsubishi Chemical Corporation).

Steel-wool #0000 produced by Nippon Steel Wool Co., Ltd., was mounted on a paperboard abrasion resistance test machine (produced by Kumagai Riki Kogyo Co., Ltd.), and was rubbed on the surface of the low refractive index layer of the anti-glare film 10 times with a 250 g load. Then, the change $\delta H$ of the HAZE value on the rubbed portion as calculated by the following equation 3 was measured by a HAZE meter. Here, the larger the measured value, the inferior the abrasion resistance.

$\delta H$=HAZE value after test−HAZE value before test   (equation 3)

After a drop of rapeseed oil was dropped on the surface of the low refractive index layer, the rapeseed oil was rubbed 20 times using a wiper (trade name: Clean Wiper SF30C, produced by Kuraray Co., Ltd.) containing ligroin. Subsequently, an SEM photograph was taken of the wiped surface, and adhesion of the rapeseed oil was observed. The contamination resistance was evaluated by criteria as follows: a case in which the rapeseed oil was extremely adhered: Low, and a case in which the rapeseed oil was not adhered at all: High.

TABLE 1

| Samples | Electro-conductive Inorganic Fine Particles Content (%) | Total Light Transmittance (%) | HAZE (%) | Reflectivity (%) | Surface Electric Resistance (Ω) | Abrasion Resistance $\delta H$ | Contamination Resistance |
|---|---|---|---|---|---|---|---|
| Sample 1 | 85 | 94.30 | 0.64 | 0.57 | $3.9 \times 10^9$ | 0.47 | High |
| Sample 2 | 67 | 94.07 | 0.75 | 0.62 | $\geq 10^{14}$ | 1.50 | High |
| Sample 3 | 0 | 93.12 | 0.60 | 2.13 | $\geq 10^{14}$ | 0.58 | High |
| Sample 4 | 85 | 93.75 | 0.68 | 0.76 | $4.6 \times 10^9$ | 1.17 | Low |
| Sample 5 | 70 | 94.28 | 0.72 | 0.65 | $\geq 10^{14}$ | 1.22 | High |

As is apparent from Table 1, in the anti-glare film of Sample 1 which was in accordance with the first embodiment of the present invention, superior low reflective properties, conductivity, abrasion resistance, and contamination resistance were obtained by using electroconductive inorganic fine particles containing radiation curable resin in the high refractive index layer, and using fluorine containing polysiloxane in the low refractive index layer. In contrast, in the anti-glare film of Sample 2 for comparison, conductivity and abrasion resistance were inferior; in the anti-glare film of Sample 3 for comparison, low reflective properties and conductivity were inferior; and in the anti-glare film of Sample 4 for comparison, abrasion resistance and contamination resistance were inferior, and therefore, the anti-glare films could not be used in practice. Furthermore, in the anti-glare film of Sample 5 for comparison, when the content of the electroconductive inorganic fine particles was below 75%, conductivity were inferior, and therefore, the anti-glare film could not be used in practice.

2. Second Embodiment

Sample 6

(1) Production of Hard Coat Layer

The following hard coat coating material was applied to a PET film (trade name: A 4300, produced by Toyobo Co., Ltd.) having a thickness of 100 μm by using a reverse coating method, and after drying at 100° C. for 1 minute, the coating was cured in a nitrogen gas atmosphere by irradiation with UV light (irradiation distance: 10 cm, irradiation time: 30 seconds) using a converging type high pressure mercury lamp of 120 W/cm. As a result, a hard coat layer having a thickness of 2.5 μm and a refractive index of 1.64 was produced.

Mixing Ratio of Hard Coat Coating Material 7 parts of polyester resin having an average molecular weight of 65000, an acid value of 7 mg KOH/g, and non-volatile components of 60%, which was produced by reacting neopentylglycol and polybasic acid consisting of isophthalic acid and adipic acid, 1.8 parts of dipentaerythritol tetraacrylate, 34 parts of ITO powder having average primary particle diameter of 0.05 μm and content of Sn to In of 5 mol %, and 57.2 parts of mixed solvent of n-butanol and xylene at a weight ratio of 4/6.

The above material and 50 cc of glass beads were put into a 250 cc container and were mixed for 5 hours by a paint shaker. After the mixing, 0.2 parts of a photoinitiator (trade name: IRGACURE 907, produced by Ciba-Geigy Co., Ltd.) was dissolved, and a hard coat coating material was produced.

(2) Production of Low Refractive Index Layer

The following low refractive index coating material was applied to the above hard coat layer by using a reverse coating method, and the coating was cured by drying at 100° C. for 1 minute.

Mixing Ratio of Low Refractive Index Coating Material 7.9 parts of fluorine containing polysiloxane (trade name: LR 204-1, solid concentration: 6.46%, produced by Nissan Chemical Industries, Ltd.), and 12.1 parts of methyl isobutyl ketone.

Subsequently, the low refractive index layer was cured by heating at 60° C. for 120 hours, and therefore, an anti-glare film of the present invention having a thickness of 0.1 μm, a refractive index of 1.38, and a reflectivity of 0.81% was produced.

Sample 7

(1) Production of Hard Coat Layer

The following hard coat coating material was applied to a PET film (trade name: A 4300, produced by Toyobo Co., Ltd.) having a thickness of 100 μm by using a reverse coating method, and after drying at 100° C. for 1 minute, the coating was cured in a nitrogen gas atmosphere by irradiation with UV light (irradiation distance: 10 cm, irradiation time: 30 seconds) using a converging type high pressure mercury lamp of 120 W/cm. As a result, a hard coat layer having a thickness of 2.5 μm and a refractive index of 1.61 was produced.

Mixing Ratio of Hard Coat Coating Material 8.4 parts of polyester resin having an average molecular weight of 65000, an acid value of 7 mg KOH/g, and non-volatile components of 60%, which was produced by reacting neopentylglycol and polybasic acid consisting of isophthalic acid and adipic acid, 2.1 parts of dipentaerythritol tetraacrylate, 32.8 parts of SnO having average primary particle diameter of 0.05 μm, and 56.7 parts of mixed solvent of n-butanol and xylene at a weight ratio of 4/6.

The above material and 50 cc of glass beads were put into a 250 cc container and were mixed for 5 hours by a paint shaker. After the mixing, 0.2 parts of a photoinitiator (trade name: IRGACURE 907, produced by Ciba-Geigy Co., Ltd.) was dissolved, and a hard coat coating material was produced.

(2) Production of Low Refractive Index Layer

The same low refractive index coating material as that of Sample 6 was applied to the above hard coat layer by using a reverse coating method, and the coating was cured by drying at 100° C. for 1 minute.

Subsequently, the low refractive index layer was cured by heating at 60° C. for 120 hours, and therefore, an anti-glare film of the present invention having a thickness of 0.1 μm, a refractive index of 1.38, and a reflectivity of 0.79% was produced.

Sample 8

(1) Production of Hard Coat Layer

As a hard coat coating material, tin oxide containing UV curable resin (trade name: ESB-3, solid concentration: 29.7%, SnO content in solid component: 82.0%, produced by Dai Nippon Toryo Co., Ltd.) was applied to a PET film (trade name: A 4300, produced by Toyobo Co., Ltd.) having a thickness of 100 μm by using a reverse coating method, and after drying at 100° C. for 1 minute, the coating was cured in a nitrogen gas atmosphere by irradiation with UV light (irradiation distance: 10 cm, irradiation time: 30 seconds) using a converging type high pressure mercury lamp of 120 W/cm. As a result, a hard coat layer having a thickness of 2.5 μm and a refractive index of 1.60 was produced.

(2) Production of Low Refractive Index Layer

The same low refractive index coating material as that of Sample 6 was applied to the above hard coat layer by using a reverse coating method, and the coating was cured by drying at 100° C. for 1 minute.

Subsequently, the low refractive index layer was cured by heating at 60° C. for 120 hours, and therefore, an anti-glare film of the present invention having a thickness of 0.1 μm, refractive index of 1.38, and a reflectivity of 0.82% was produced.

Sample 9

(1) Production of Hard Coat Layer

As a hard coat coating material, zirconia oxide containing a UV curable resin (trade name: KZ7391, solid concentration: 42%, ZrO content in solid component: 68.0%, produced by JSR Corporation) was applied to a PET film (trade name: A4300, produced by Toyobo Co., Ltd.) having a thickness of 100 μm by using a reverse coating method, and after drying at 100° C. for 1 minute, the coating was cured in a nitrogen gas atmosphere by irradiation with UV light (irradiation distance: 10 cm, irradiation time: 30 seconds) using a converging type high pressure mercury lamp of 120 W/cm. As a result, a hard coat layer having a thickness of 2.5 μm and a refractive index of 1.69 was produced.

(2) Production of Low Refractive Index Layer

The same low refractive index coating material as that of Sample 6 was applied to the above hard coat layer by using a reverse coating method, and the coating was cured by drying at 100° C. for 1 minute.

Subsequently, the low refractive index layer was cured by heating at 60° C. for 120 hours, and therefore, an anti-glare film for comparison having a thickness of 0.1 μm, a refractive index of 1.38, and a reflectivity of 0.85% was produced.

Sample 10

(1) Production of Hard Coat Layer

The following hard coat coating material was applied to a PET film (trade name: A 4300, produced by Toyobo Co., Ltd.) having a thickness of 100 μm by using a reverse coating method, and after drying at 100° C. for 1 minute, the coating was cured in a nitrogen gas atmosphere by irradiation with UV light (irradiation distance: 10 cm, irradiation time: 30 seconds) using a converging type high pressure mercury lamp of 120 W/cm. As a result, a hard coat layer having a thickness of 2.5 μm and a refractive index of 1.52 was produced.

Mixing Ratio of Hard Coat Coating Material 38 parts of UV curable urethane acrylate oligomer (trade name: UV 7600 B, solid concentration: 100%, produced by The Nippon Synthetic Chemical Industry, Co., Ltd.), 2 parts of a photoinitiator (trade name: IRGACURE 184, produced by Ciba-Geigy Co., Ltd.), 36 parts of methylethylketone, and 24 parts of cyclohexanone.

(2) Production of Low Refractive Index Layer

The same low refractive index coating material as that of Sample 6 was applied to the above hard coat layer by using a reverse coating method, and the coating was cured by drying at 100° C. for 1 minute.

Subsequently, the low refractive index layer was cured by heating at 60° C. for 120 hours, and therefore, an anti-glare film for comparison having a thickness of 0.1 μm, a refractive index of 1.38, and a reflectivity of 2.13% was produced.

Sample 11

(1) Production of Hard Coat Layer

The same hard coat coating material as that of Sample 6 was applied to a PET film (trade name: A 4300, produced by Toyobo Co., Ltd.) having a thickness of 100 μm by using a reverse coating method, and after drying at 100° C. for 1 minute, the coating was cured in a nitrogen gas atmosphere by irradiation with UV light (irradiation distance: 10 cm, irradiation time: 30 seconds) using a converging type high pressure mercury lamp of 120 W/cm. As a result, a hard coat layer having a thickness of 2.5 μm and a refractive index of 1.64 was produced.

(2) Production of Low Refractive Index Layer

The following low refractive index coating material was applied to the above hard coat layer by using a reverse coating method, and the coating was cured by drying at 100° C. for 1 minute.

Mixing Ratio of Low Refractive Index Coating Material 10 parts of silica sol (ethanol dispersion which contains silica ultrafine particles having particle diameter of 15 nm and content of $SiO_2$ of 30 weight %), 15 parts of film forming agent (hydrolyzate of tetraethoxysilane having solid concentration calculated as $SiO_2$ of 6%, and 53 parts of ethanol.

Subsequently, the low refractive index layer was cured by heating at 60° C. for 120 hours, and therefore, an anti-glare film for comparing having a thickness of 0.1 μm, a refractive index of 1.38, and a reflectivity of 0.92% was produced.

Sample 12

(1) Production of Hard Coat Layer

The following hard coat coating material was applied to a PET film (trade name: A4300, produced by Toyobo Co., Ltd.) having a thickness of 100 μm by using a reverse coating method, and after drying at 100° C. for 1 minute, the coating was cured in a nitrogen gas atmosphere by irradiation with UV light (irradiation distance: 10 cm, irradiation time: 30 seconds) using a converging type high pressure mercury lamp of 120 W/cm. As a result, a hard coat layer having a thickness of 2.5 μm and a refractive index of 1.61 was produced.

Mixing Ratio of Hard Coat Coating Material 14 parts of polyester resin having an average molecular weight of 65000, an acid value of 7 mg KOH/g, and non-volatile components of 60%, which was produced by reacting neopentylglycol and polybasic acid consisting of isophthalic acid and adipic acid, 3.6 parts of dipentaerythritol tetraacrylate, 28 parts of ITO powder having average primary particle diameter of 0.05 μm and content of Sn to In of 5 mol %, and 54.4 parts of mixed solvent of n-butanol and xylene at weight ratio of 4/6.

The above material and 50 cc of glass beads were put into a 250 cc container and were mixed for 5 hours by a paint shaker. After the mixing, 0.2 parts of a photoinitiator (trade name: IRGACURE 907, produced by Ciba-Geigy Co., Ltd.) was dissolved, and a hard coat coating material was produced.

(2) Production of Low Refractive Index Layer

The same low refractive index coating material as that of Sample 6 was applied to the above hard coat layer by using a reverse coating method, and the coating was cured by drying at 100° C. for 1 minute.

Subsequently, the low refractive index layer was cured by heating at 60° C. for 120 hours, and therefore, an anti-glare film for comparison having a thickness of 0.1 μm, a refractive index of 1.38, and a reflectivity of 0.95% was produced.

With regard to the anti-glare films of Samples 6 to 12 as obtained above, total light transmittance, HAZE value, reflectivity, surface electric resistance, abrasion resistance, and contamination resistance, were measured and evaluated by the same methods as those of the above first embodiment.

TABLE 2

| Samples | Electro-conductive Inorganic Fine Particles Content (%) | Total Light Transmittance (%) | HAZE (%) | Reflectivity (%) | Surface Electric Resistance (Ω) | Abrasion Resistance δH | Contamination Resistance |
| --- | --- | --- | --- | --- | --- | --- | --- |
| Sample 6 | 85 | 92.03 | 0.51 | 0.81 | $7.0 \times 10^6$ | 0.03 | High |
| Sample 7 | 82 | 91.95 | 0.96 | 0.79 | $4.0 \times 10^9$ | 0.08 | High |
| Sample 8 | 82 | 91.96 | 0.77 | 0.82 | $2.5 \times 10^9$ | 0.14 | High |
| Sample 9 | 67 | 93.73 | 0.41 | 0.85 | $\geq 10^{14}$ | 1.22 | High |

TABLE 2-continued

| Samples | Electro-conductive Inorganic Fine Particles Content (%) | Total Light Transmittance (%) | HAZE (%) | Reflectivity (%) | Surface Electric Resistance (Ω) | Abrasion Resistance δH | Contamination Resistance |
|---|---|---|---|---|---|---|---|
| Sample 10 | 0 | 93.12 | 0.60 | 2.13 | $\geq 10^{14}$ | 0.58 | High |
| Sample 11 | 85 | 91.75 | 0.60 | 0.92 | $8.0 \times 10^{6}$ | 1.24 | Low |
| Sample 12 | 70 | 91.08 | 0.60 | 0.95 | $1.0 \times 10^{12}$ | 0.80 | High |

As is apparent from Table 2, in the anti-glare films of Samples 6 to 8 which were in accordance with the second embodiment of the present invention, superior low reflective properties, conductivity, abrasion resistance, and contamination resistance were obtained by using electroconductive inorganic fine particles containing radiation curable resin in the hard coat layer, and using fluorine containing polysiloxane in the low refractive index layer. In contrast, in the anti-glare film of Sample 9 for comparison, conductivity and abrasion resistance were inferior; in the anti-glare film of Sample 10 for comparison, low reflective properties and conductivity were inferior; and in the anti-glare film of Sample 11 for comparison, abrasion resistance and contamination resistance were inferior, and therefore, the anti-glare films could not be used in practice. Furthermore, in the anti-glare film of Sample 12 for comparison, when the content of the electroconductive inorganic fine particles was below 75%, conductivity was inferior, and therefore, the anti-glare film could not be used in practice.

What is claimed is:

1. An anti-glare film comprising:
a transparent substrate;
a hard coat layer;
a high refractive index layer; and
a low refractive index layer,
wherein the high refractive index layer contains a radiation curable resin composition containing electroconductive inorganic ultrafine particles, and has a refractive index after curing of 1.6 to 1.8,
the low refractive index layer contains fluorine containing polysiloxane, and has a refractive index after curing of 1.36 to 1.42,
the electroconductive inorganic ultrafine particle is at least one selected from tin oxide, indium tin oxide (ITO), and zinc oxide, and is contained at 75% or more by weight ratio in the high refractive index layer, and
average reflectivity is not more than 1%, total light transmittance is at least 90%, and HAZE value is not more than 2%.

2. An anti-glare film comprising:
a transparent substrate;
a hard coat layer; and
a low refractive index layer,
wherein the hard coat layer contains a radiation curable resin composition containing electroconductive inorganic ultrafine particles, has a thickness of 1.0 to 5.0 μm, and has a refractive index after curing of 1.6 to 1.8,
the low refractive index layer contains fluorine containing polysiloxane, and has a refractive index after curing of 1.36 to 1.42,
the electroconductive inorganic ultrafine particle is at least one selected from tin oxide, indium tin oxide (ITO), and zinc oxide, and is contained at 75% or more by weight ratio in the hard coat layer, and
average reflectivity is not more than 1%, total light transmittance is at least 90%, and HAZE value is not more than 2%.

3. An anti-glare film according to claim 1, wherein surface resistance measured on the surface of the low refractive index layer is less than $10^{11}$ Ω/sq.

4. An anti-glare film according to claim 1, wherein an amount of change in a HAZE value during an abrasion resistance test using steel-wool is not more than 0.5%.

5. An anti-glare film according to claim 1, wherein the hard coat layer contains transparent resin fine particles.

6. An anti-glare film according to claim 1, wherein the hard coat layer has a rough surface on the surface thereof.

7. An anti-glare film according to claim 2, wherein a refractive index of the hard coat layer after curing is 1.45 to 1.55.

8. An anti-glare film according to claim 2, wherein surface resistance measured on the surface of the low refractive index layer is less than $10^{11}$ Ω/sq.

9. An anti-glare film according to claim 2, wherein an amount of change in a HAZE value during an abrasion resistance test using steel-wool is not more than 0.5%.

10. An anti-glare film according to claim 2, wherein the hard coat layer contains transparent resin fine particles.

11. An anti-glare film according to claim 2, wherein the hard coat layer has a rough surface on the surface thereof.

12. An anti-glare film comprising:
a transparent substrate;
a hard coat layer;
a high refractive index layer; and
a low refractive index layer,
wherein the high refractive index layer contains a radiation curable resin composition containing electroconductive inorganic ultrafine particles, and has a refractive index after curing of 1.6 to 1.8,
the low refractive index layer contains fluorine containing polysiloxane, and has a refractive index after curing of 1.36 to 1.42,
the electroconductive inorganic ultrafine particle is at least one selected from tin oxide, indium tin oxide (ITO), and zinc oxide, and is contained at 75% or more by weight ratio in the high refractive index layer, and
an amount of change in a HAZE value during an abrasion resistance test using steel-wool is not more than 0.5%.

13. An anti-glare film comprising:
a transparent substrate;
a hard coat layer; and
a low refractive index layer,
wherein the hard coat layer contains a radiation curable resin composition containing electroconductive inorganic ultrafine particles, has a thickness of 1.0 to 5.0 μm, and has a refractive index after curing of 1.6 to 1.8,
the low refractive index layer contains fluorine containing polysiloxane, and has a refractive index after curing of 1.36 to 1.42, the electroconductive inorganic ultrafine particle is at least one selected from tin oxide, indium tin oxide (ITO), and zinc oxide, and is contained at 75% or more by weight ratio in the hard coat layer, and an amount of change in a HAZE value during an abrasion resistance test using steel-wool is not more than 0.5%.

* * * * *